(12) United States Patent
Turbin

(10) Patent No.: US 9,661,260 B2
(45) Date of Patent: May 23, 2017

(54) PHOTOGRAPH OR VIDEO TAGGING BASED ON PEERED DEVICES

(71) Applicant: Synchronoss Technologies, Inc., Bridgewater, NJ (US)

(72) Inventor: Pavel Turbin, Helsinki (FI)

(73) Assignee: Synchronoss Technologies, Inc., Bridgewater, NJ (US)

( * ) Notice: Subject to any disclaimer, the term of this patent is extended or adjusted under 35 U.S.C. 154(b) by 179 days.

(21) Appl. No.: 14/170,904

(22) Filed: Feb. 3, 2014

(65) Prior Publication Data

US 2015/0222844 A1    Aug. 6, 2015

(51) Int. Cl.
| | |
|---|---|
| *H04N 5/77* | (2006.01) |
| *H04N 9/80* | (2006.01) |
| *H04N 5/91* | (2006.01) |
| *H04W 4/02* | (2009.01) |
| *H04N 9/82* | (2006.01) |

(52) U.S. Cl.
CPC ............ *H04N 5/91* (2013.01); *H04N 9/8205* (2013.01); *H04W 4/02* (2013.01); *H04W 4/021* (2013.01)

(58) Field of Classification Search
USPC .................................. 386/200–234, 239–248
See application file for complete search history.

(56) References Cited

U.S. PATENT DOCUMENTS

| | | | |
|---|---|---|---|
| 6,526,158 B1* | 2/2003 | Goldberg | G03D 15/001 |
| | | | 382/103 |
| 2005/0067496 A1 | 3/2005 | Yen et al. | |
| 2006/0256007 A1* | 11/2006 | Rosenberg | G01C 3/18 |
| | | | 342/357.4 |
| 2006/0256008 A1* | 11/2006 | Rosenberg | G01C 21/20 |
| | | | 342/367 |

(Continued)

FOREIGN PATENT DOCUMENTS

| | | |
|---|---|---|
| EP | 1808799 A1 | 7/2007 |
| EP | 2 225 867 | 6/2009 |

(Continued)

OTHER PUBLICATIONS

Search Report from the UK Intellectual Property Office, Application No. GB1501524.1, Date of Search : Jul. 1, 2015, pp. 2.

(Continued)

*Primary Examiner* — Hung Dang
(74) *Attorney, Agent, or Firm* — Synchronoss Technologies, Inc.; Frederick W. Dour

(57) ABSTRACT

A method of capturing photographs or videos and associated metadata. The method includes capturing a photograph or video using a mobile camera device at a shooting location and encompassing a shooting area, identifying a shooting area using positional and orientational detectors of the mobile camera device and known camera properties and recording a definition of the shooting area, and sending the captured photograph or video to a server system. Either at the mobile camera device or at the server system, the (Continued)

presence of peer mobile devices within the shooting area is identified using positional information reported by those peer mobile devices, and the captured photograph or video is tagged with identities associated with those peer mobile devices.

18 Claims, 6 Drawing Sheets

(56) References Cited

U.S. PATENT DOCUMENTS

| | | |
|---|---|---|
| 2007/0237427 A1 | 10/2007 | Patel et al. |
| 2007/0273583 A1* | 11/2007 | Rosenberg ............ H04W 8/005 342/367 |
| 2008/0231879 A1 | 9/2008 | Takemoto |
| 2010/0141778 A1* | 6/2010 | Basson ................. H04N 5/232 348/207.1 |
| 2010/0311347 A1 | 12/2010 | Le Thierry D'Ennequin et al. |
| 2012/0003998 A1* | 1/2012 | McGary ........................ 455/466 |
| 2012/0233000 A1* | 9/2012 | Fisher et al. ............... 705/14.71 |
| 2012/0249787 A1* | 10/2012 | Allegra .................... H04N 7/18 348/143 |
| 2013/0013683 A1 | 1/2013 | Elliott |
| 2013/0027569 A1* | 1/2013 | Parulski ............. H04N 5/23219 348/207.1 |
| 2014/0002712 A1* | 1/2014 | Spielberg ...................... 348/345 |
| 2014/0037157 A1* | 2/2014 | Takaoka ........................ 382/118 |
| 2014/0280941 A1* | 9/2014 | Maguire ...................... 709/225 |
| 2014/0368670 A1 | 12/2014 | Morley |
| 2015/0189026 A1* | 7/2015 | Cohen .................... H04L 51/32 709/204 |

FOREIGN PATENT DOCUMENTS

| | | |
|---|---|---|
| GB | 2403099 A | 12/2004 |
| WO | 2014200678 A1 | 12/2014 |

OTHER PUBLICATIONS

Corrected Search Report from the UK Intellectual Property Office, Application No. GB1501524.1, Date of Search : Jul. 13, 2015, pp. 1.

* cited by examiner

PHOTOGRAPH OR VIDEO TAGGING BASED ON PEERED DEVICES

TECHNICAL FIELD

The present invention relates to the tagging of digital photographs or videos based on the identities of mobile devices of users whose images are captured in the media. It is applicable in particular, though not necessarily, to situations where a photograph or video is captured using a smartphone.

BACKGROUND

In the course of their lives people attend a great variety of events; these events may be formal (for example, graduations or work events) or informal (for example, parties and social gatherings), large (for example, music festivals) or small (for example, dinner parties). The memories of such events can be preserved in the form of recorded media, and the proliferation of smartphones with cameras and other portable media-recording devices means that people can easily capture memories of events in a variety of forms of recorded media, including photographs and video.

People attending or organising an event may take a large number of photographs or videos using for example a smartphone, and may wish to share these photographs or videos with others. These photographs or videos may be collected in a social media "event page". It may be desirable to group the photographs or videos based on the people captured in the photographs or videos, or to search for photographs or videos containing a particular person. To achieve this, the people captured in the photographs or videos must be identified and the photographs or videos must be tagged. The conventional methods for identifying people captured in photographs or videos involve facial recognition and manual tagging; this process is slow, and requires manual processing by a user. The process of identifying the people captured in photographs or videos of an event, which must be carried out before the photographs or videos can be grouped or searched, can therefore be laborious.

EP2225867 discloses a method of tagging photographs captured using a smartphone by employing a directional antenna located on the smartphone.

SUMMARY

It is an object of the present invention to provide an efficient and labour-saving method of capturing a photograph or video and tagging said photograph or video with identities associated with the mobile devices of users captured in the photograph or video.

According to a first aspect of the invention there is provided a method of capturing photographs or videos and associated metadata. The method comprises: capturing a photograph or video using a mobile camera device at a shooting location and encompassing a shooting area; identifying the shooting area using positional and orientational detectors of the mobile camera device and known camera properties and recording a definition of the shooting area; and sending the captured photograph or video to a server system. Either at the mobile camera device or at the server system, the presence of peer mobile devices within the shooting area is identified by comparing positional information reported by those peer mobile devices with said recorded definition of the shooting area, and the captured photograph or video is tagged with identities associated with those peer mobile devices. It is to be appreciated that the order in which the steps of this method are carried out is not limited to that shown here; the steps of the method may be carried out in a different order.

As an option, the presence of peer mobile devices within the shooting area may be identified at the server system, the server system receiving positional information reported by peer mobile devices and correlating timing information with the times at which photographs or videos were taken.

As an option, a peer mobile device may report its positional information and identity to the mobile camera device. The peer mobile device may report its positional information and identity to the mobile camera device using one of; Bluetooth™; direct peer-to-peer wifi or 3G connections; RFID awareness established between the peer mobile device and the mobile camera device; and sending/receiving SMS messages.

As an option, a peer mobile device may report its positional information and identity to the server system.

As an option, the position of the mobile camera device may be determined as absolute coordinates using a positioning unit of the mobile camera device.

As an option, the positional information reported by a peer mobile device may comprise absolute coordinates determined using a positioning unit of the peer mobile device.

As an option, the known camera properties may comprise one or more of; a camera depth of focus, a focus distance, and a view angle.

As an option, said camera properties may be determined by one of: retrieving them from a record stored on the mobile camera device; retrieving them from data stored in a photograph or video file.

According to a second aspect of the invention there is provided a mobile camera device. The mobile camera device comprises: a camera for capturing photographs and/or videos; a positioning unit for determining a current position of the device; an orientation determining unit for determining an orientation of the device; a shooting area determining unit for determining and recording a shooting area using an obtained current position and orientation; a peer mobile device identification unit for determining the identities of peer mobile devices located within said shooting area; a tagging unit for tagging captured photographs and/or videos with said identities; and a photograph and/or video upload unit for uploading tagged photographs and/or videos to a server system via a wireless network.

As an option, said peer mobile device identification unit may be configured to receive positional information from peer mobile devices and to compare this information to the shooting area in order to determine whether the peer mobile devices are located within said shooting area.

According to a third aspect of the invention there is provided a server system. The server system comprises a first receiver for receiving photographs and/or videos, and associated shooting area definitions, from client devices; a second receiver for receiving the locations of client devices from those devices; and a tagging unit for identifying client devices within the shooting areas associated with respective photographs and/or videos, and for tagging photographs and/or videos with the identities of identified client devices or their users.

As an option, said tagging unit may correlate timing information associated with said locations with the times at which photographs or videos were taken in order to identify client devices within the shooting areas.

According to a fourth aspect of the invention there is provided a computer program comprising computer readable code. When run on a mobile camera device, the computer readable code causes the computer program to perform the following steps: capture photographs and/or videos; determine a current position of the device; determine an orientation of the device; determine and record a shooting area using an obtained current position and orientation; determine the identities of peer mobile devices located within said shooting area; tag captured photographs and/or videos with said identities; and upload tagged photographs and/or videos to a server system via a wireless network.

DETAILED DESCRIPTION

Apparatuses and a method are presented here that provide a way to easily tag a photograph or video captured using a mobile camera device based on identities associated with devices contained within a shooting area. For the purposes of the following discussion, the mobile camera device may be considered to be a smartphone having a camera and mobile/cellular connectivity. Of course, it will be appreciated that the invention encompasses other mobile devices such as, for example, digital cameras with wireless connectivity.

Figure 1:
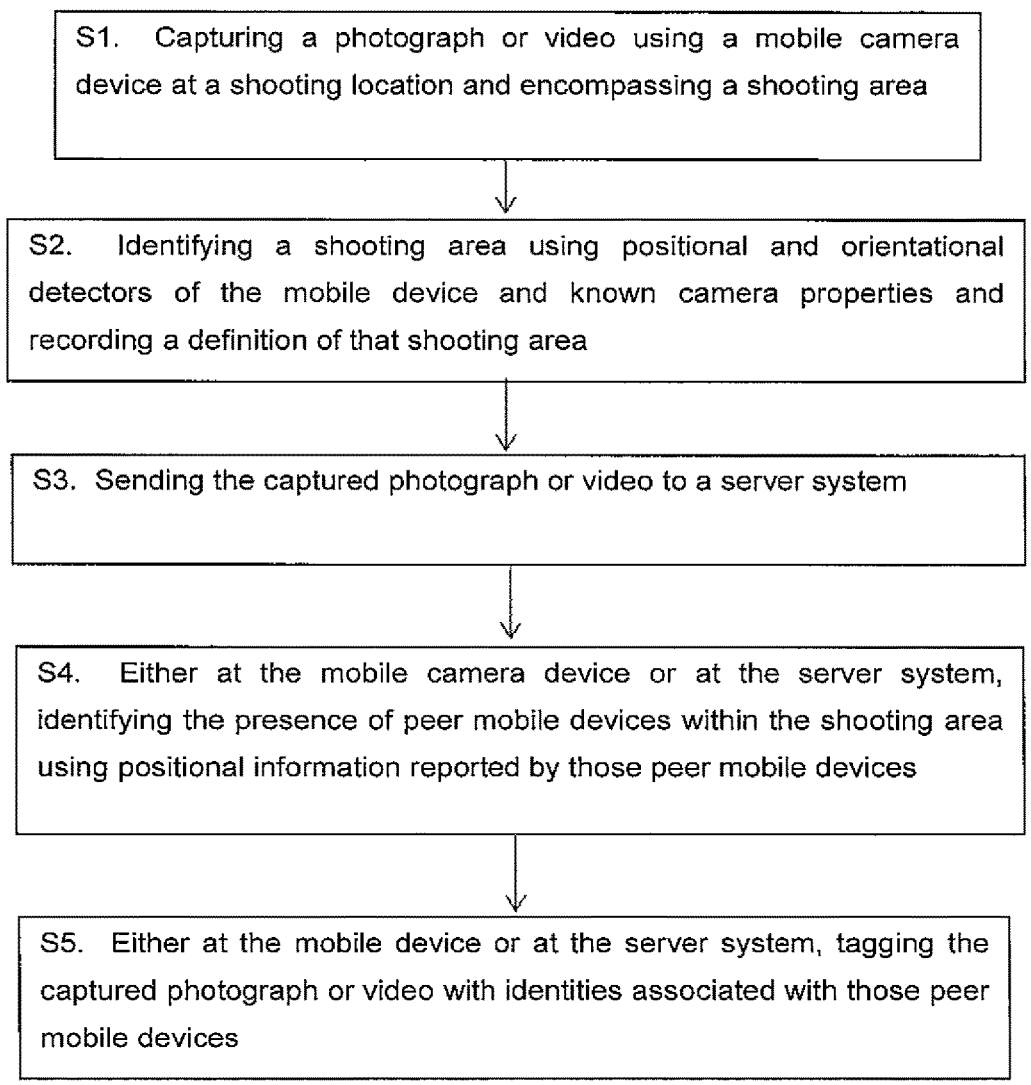
FIG. 1 is a flow diagram illustrating a method of capturing photographs or videos and associated metadata, and tagging the photographs or videos using the associated metadata.

As shown in FIG. 1, the steps of the method presented comprise:
1. Capturing a photograph or video using a mobile camera device at a shooting location and encompassing a shooting area;
2. Identifying the shooting area using positional and orientational detectors of the mobile camera device and known camera properties and recording a definition of that shooting area;
3. Sending the captured photograph or video to a server system; and,
   either at the mobile camera device or at the server system:
4. identifying the presence of peer mobile devices within the shooting area using positional information reported by those peer mobile devices; and
5. Tagging the captured photograph or video with identities associated with those peer mobile devices.

Figure 2:
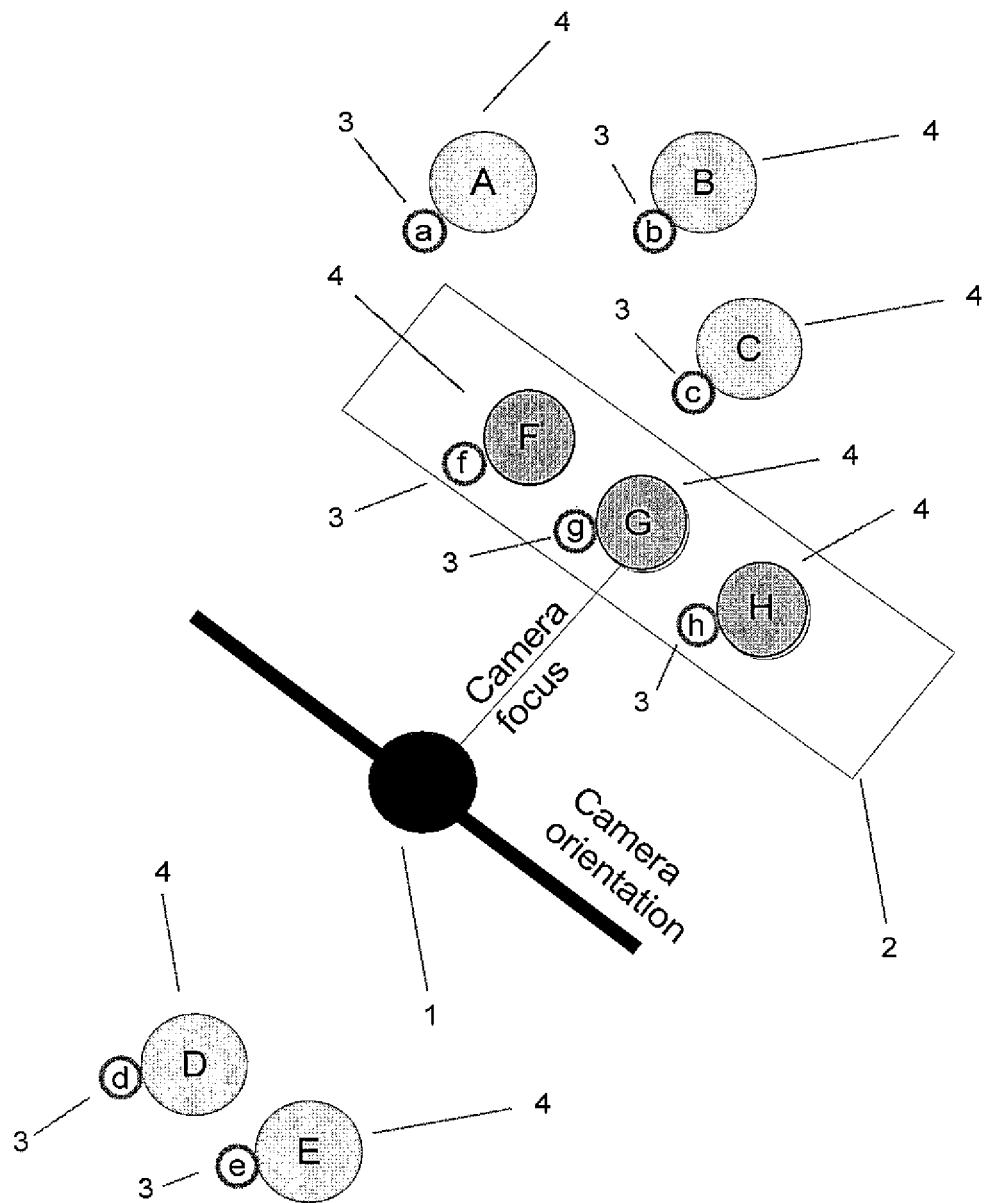
FIG. 2 illustrates schematically a mobile camera device that is used to take a photograph or video and an associated a shooting area.

In step 1, a photograph or video is captured using a mobile camera device 1. Together, the absolute position of the mobile camera device, focus distance, focal depth, and angle of view, define a "shooting area" (although fewer or more parameters may be used to define the shooting area). Referring to FIG. 2, all of the mobile devices—comprising mobile camera device 1, and peer mobile devices 3 of users 4—are peered together. The mobile device peering can be direct or indirect.

In the case of direct peering every mobile device "knows" its peers and can exchange information with them. Direct peering may be used when the number of mobile devices is small (as in FIG. 2) and where the users trust each other, for example, at family events. Direct peering can be achieved, for example, using Bluetooth™ pairing, by establishing direct peer-to-peer wifi or 3G connections between the mobile devices, by establishing and monitoring RFID awareness between the mobile devices, or by sending/receiving SMS messages between mobile devices over known phone numbers. Other methods of peering will also be envisaged by the skilled person.

In the case of indirect peering, the exchange of information between the mobile devices may occur via a server system, for example a server. Indirect peering may be used in particular when there is a large number of mobile devices in a given location and when privacy between the mobile devices is important, for example at public sport events or music festivals. In the case of indirect peering, the mobile devices can communicate with the server system at predetermined time intervals to provide, for example, position information, or upon receiving a request from the server system.

In step 2, a shooting area is identified using positional and orientational detectors of the mobile camera device and known camera properties. The positional detectors of the mobile camera device may be configured to provide positional information comprising absolute coordinates using GPS or so-called "multilateration". The orientational detectors of the mobile camera device may be orientation and/or rotation vector sensors configured to provide information comprising the orientation of the mobile camera device in three dimensions. Such features are now standard on many smartphones. The known camera properties may comprise the camera focus distance, depth of focus, and view angle. This data may be retrieved from some device properties record stored in the device, or by retrieving data associated with the photograph or video that may be saved in the photograph or video file (for example saved by the camera as EXF data).

The shooting area 2 therefore defines a region that is estimated to contain the subject or subjects 4F, 4G and 4H of the photograph or video captured using the mobile camera device. A definition of the shooting area is then recorded. The definition of the shooting area may comprise, for example, a cuboid volume with vertices that are defined by absolute location coordinates.

In step 3 the captured photograph or video is sent to a server system.

In step 4, the presence of peer mobile devices within the shooting area is identified using positional information reported by those peer mobile devices. The peer mobile devices 3 that are peered with the mobile camera device 1 report their position at the time when the photograph or video was captured. The position of the peer mobile devices 3 may be determined as absolute coordinates. In the case of direct peering, the positions of the peer mobile devices may be reported directly to the mobile camera device 1. In the case of indirect peering the positions of the peer mobile devices 3 may be reported via the server system. Alternatively, the position of the peer mobile devices 3 may be reported only to the server system. In the case that the position of the peer mobile devices is reported via the server system or only to the server system, the peer mobile devices may report their position automatically to the server system at given time intervals; alternatively, they may report their position in response to a request received from the server system. Either at the mobile camera device or at the server system, the positions of the peer mobile devices 3 that are peered with the mobile camera device 1 are compared with the position of the shooting area 2, and the peer mobile devices 3f, 3g and 3h that are located in the shooting area are identified. These peer mobile devices are the mobile devices of users 4F, 4G and 4H who are captured in the photograph or video; i.e., the users who will be identified and tagged in the photo or video.

In step 5, either at the mobile camera device or at the server system, the captured photograph or video is tagged with identities associated with the peer mobile devices 3f, 3g and 3h that are located within the shooting area. In the case of direct peering the identities for the peer mobile devices 3f, 3g and 3h that are located within the shooting area may be reported directly to the mobile camera device 1. In the case of indirect peering the identities for the peer mobile devices 3f, 3g and 3h that are located within the shooting area may be reported via a server system. These methods of reporting may be used if the tagging is performed at the mobile camera device. If the tagging is performed at the server system the identities associated with the peer mobile devices 3f, 3g and 3h that are located within the shooting area may be reported only to the server system. The identity for each mobile device links each mobile device to its owner; in FIG. 2, for example, the identities for the peer mobile devices 3f, 3g and 3h in the shooting area 2 link the peer mobile devices 3 to the users 4F, 4G and 4H, who are the subject of the photograph or video captured using the mobile camera device 1. The users 4F, 4G and 4H who are the subjects of the photograph or video captured using the mobile camera device 1 are therefore identified as being in the photograph or video.

With reference to FIG. 2, although peer mobile devices 3d and 3e are peered with the mobile camera device 1, because the users 4D and 4E associated with peer mobile, devices 3d and 3e are behind the mobile camera device 1 and are therefore not in the shooting area 2, users 4D and 4E are not identified as being in the photograph or video. Although users 4A, 4B and 4C may be in the photograph or video, because they (and their peer mobile devices 3a, 3b and 3c) are not within the shooting area 2 they are not identified as being in the photograph or video. It is nonetheless possible that the photograph or video is associated with the identities of users 4D and 4E, in order to indicate that the photograph or video might be of interest to them. This may involve a separate metadata classification, e.g. present but not within the shooting area.

Figure 3:
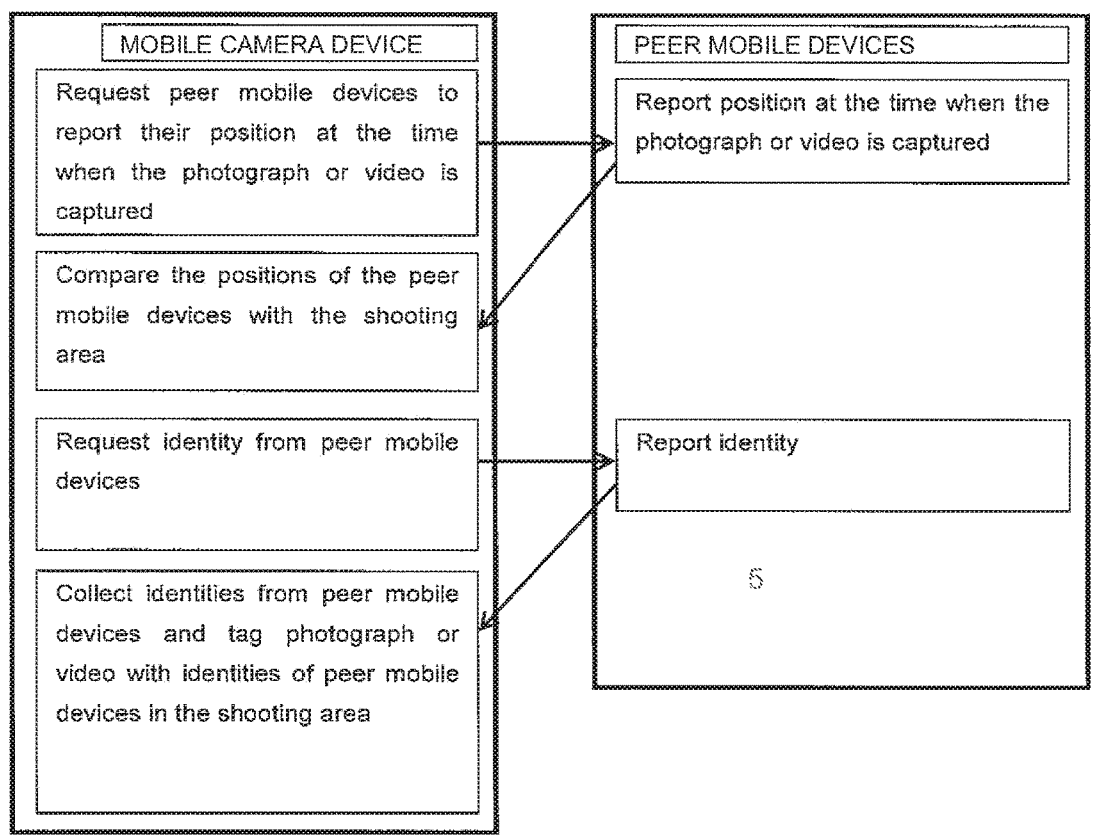
FIG. 3 illustrates schematically signalling associated with the method of FIG. 1 according to a direct peering case.

Referring to FIG. 3, in the case of the peer mobile devices being peered directly with the mobile camera device, the mobile camera device exchanges information directly with the peer mobile devices. Direct peering may be used if there is a small number of peer mobile devices and if the users have a high level of trust in each other. The steps illustrated in FIG. 3 may be carried out after the photograph or video has been captured using the mobile camera device, the shooting area has been identified, and the captured photograph or video has been sent to the server system. The mobile camera device requests the peer mobile devices to report their positions at the time at which the photograph or video was captured, and the peer mobile devices send the requested information back to the mobile camera device. If the presence of peer mobile devices within the shooting area is identified at the mobile camera device, the mobile camera device then matches the positions of the peer mobile devices at the time when the photograph or video was captured with the shooting area. That is, the mobile camera device determines if any of the peer devices were in the shooting area when the photograph or video was captured using the mobile camera device.

If the presence of peer mobile devices within the shooting area is instead identified at the server system, the mobile camera device may send shooting area data and positional data for the peer mobile devices to the server system, and the presence of peer mobile devices within the shooting area may then be identified at the server system. The mobile camera device then requests the peer mobile devices (which were in the shooting area when the photograph or video was captured) to report their identities, which link the peer mobile devices with their users. The peer mobile devices that were in the shooting area when the photograph or video was captured send their identities back to the mobile camera device. The captured photograph or video may then be tagged with the identities associated with the peer mobile devices at the mobile camera device. If the captured photograph or video is tagged with the identities associated with the peer mobile devices at the server system, the mobile camera device may send the identities associated with the peer mobile devices to the server system.

Figure 4:
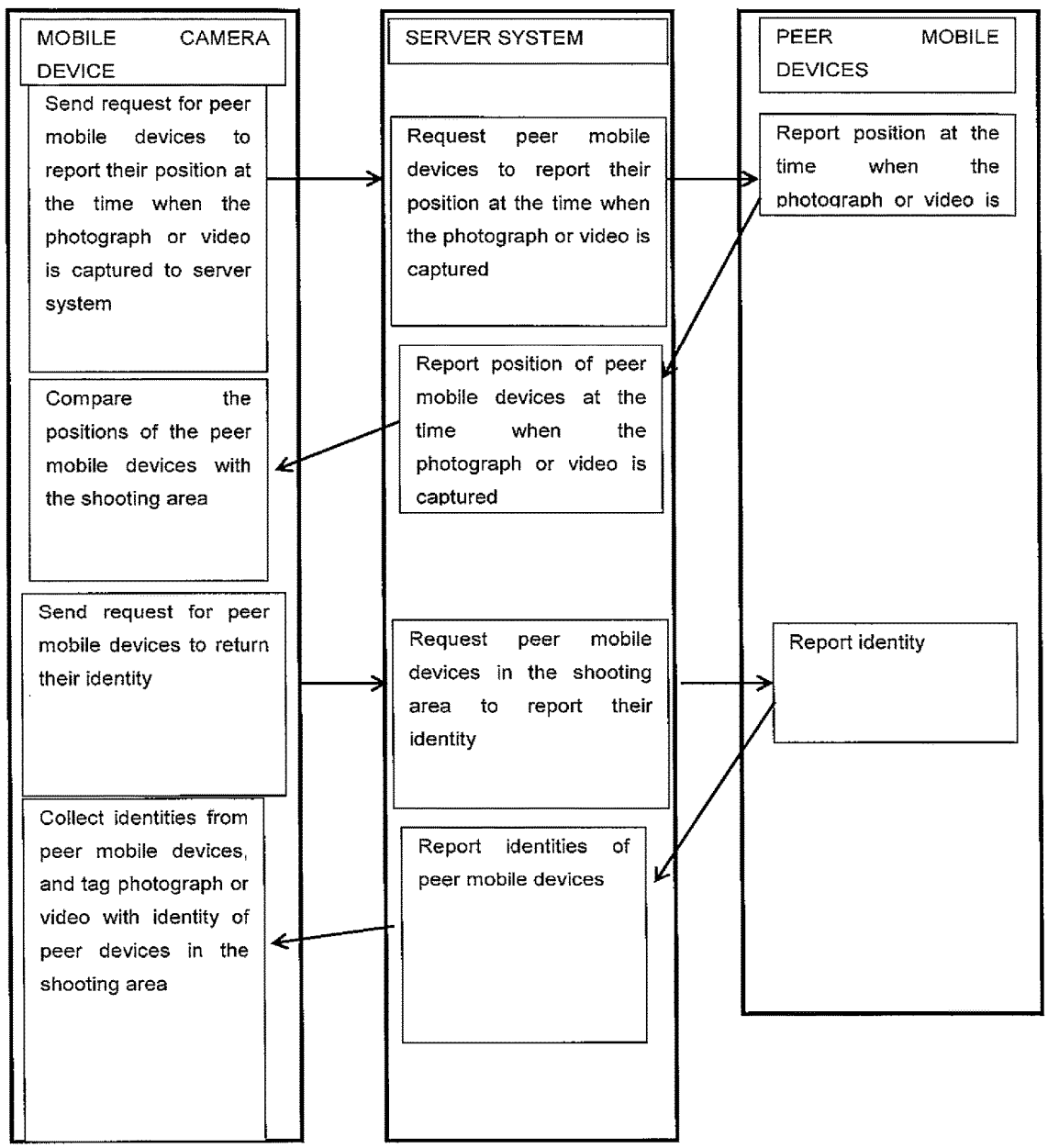
FIG. 4 illustrates schematically signalling associated with the method of FIG. 1 according to an indirect peering case.

Referring to FIG. 4, if there is a large number of peer mobile devices and/or there is no mutual trust between devices and/or there is a need for a higher level of security, the peer mobile devices may be peered indirectly with the mobile camera device. In this case information is exchanged between the mobile camera device and the peered mobile devices via a server system, which may be, for example, a server. The steps illustrated in FIG. 4 may be carried out after the photograph or video has been captured using the mobile camera device, the shooting area has been determined, and the captured photograph or video has been sent to the server system.

The mobile camera device sends a request to the server system for the peer mobile devices to report their position at the time when the photograph or video was captured. The server system then sends this request to the peer mobile devices. The peer mobile devices send their position at the time at which the photograph or video was captured back to the server system, and the server system sends the position information to the mobile camera device. This is the procedure in the case when the peer mobile devices provide their position at the time when the photograph or video was captured in response to a request from the server system.

Alternatively, the peer mobile devices automatically send their position information to the server system at given time intervals; in this case, the server system does not forward the request (from the mobile camera device) for the peer mobile devices' position information to the peer mobile devices, but instead sends the most up-to-date position information for the peer mobile devices to the mobile camera device. The mobile camera device then matches the positions of the peer mobile devices at the time when the photograph or video was captured with the shooting area. That is, the mobile camera device determines if any of the peer devices were in the shooting area when the photograph or video was captured using the mobile camera device. The mobile camera device then sends a request to the server system asking for the peer mobile devices (which were in the shooting area when the photograph or video was captured) to return their identities. The server system then sends this request to the peer mobile devices. The peer mobile devices send their identities back to the server system, and the server system sends the identities to the mobile camera device. The mobile camera device then collects the identities for the peer mobile devices.

Alternatively, the presence of peer mobile devices within the shooting area may be identified at the server system. In this case the server system may receive positional information and identity information directly from the peer mobile devices. After the photograph or video has been captured by the mobile camera device, a shooting area is determined and a definition of said shooting area is recorded. The mobile camera device may send the captured photograph or video and the recorded definition of the shooting area to the server system. The server system may then correlate the positional information with timing information reported by the peer mobile devices with the times at which photograph or video was taken, and then tag the photograph or video with the identities sent by the peer mobile devices.

Figure 5:
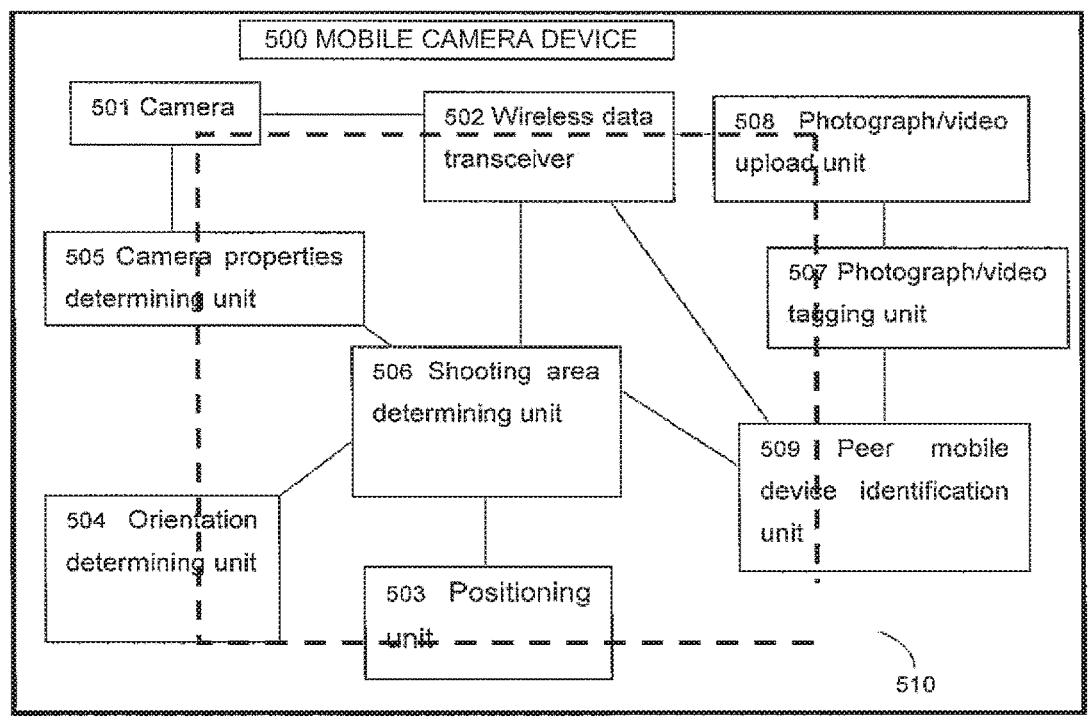
FIG. 5 illustrates schematically a mobile camera device configured to capture a photograph or video.

Referring to FIG. 5, the mobile camera device 500 of the method of FIG. 1—which may be, for example, a smartphone, or a camera with wireless connectivity—comprises a camera 501 for capturing photographs or videos. Additional information such as the time at which the photograph or video is captured may be added to the photograph or video image file as data. The wireless data transceiver 502 may be used to send requests for information—for example, positional information or identity information—directly to peer mobile devices, or via a server system, and to receive the returned information. The positioning unit 503 is used to determine a current position of the mobile camera device; this current position information may be associated with the image file for the captured photograph or video. The current position of the mobile camera device is used in combination with orientational information (obtained using the orientation determining unit 504) and camera properties (determined using the camera properties determining unit 505) to determine a shooting area using the shooting area determining unit 506. The peer mobile device identification unit 509 is used for determining the identities of peer mobile devices located within said shooting area. The photograph/video tagging unit 507 is used for tagging photographs or video based on identities associated with peer mobile devices that are located in the shooting area, wherein the peer mobile devices that are located in the shooting area are identified by comparing the locations of the peer mobile devices with the recorded definition of the shooting area. The photograph and/or video upload unit 508 is used for uploading tagged photographs and/or videos to a server system via a wireless network. The invention may be carried out using a combination of hardware and software elements; computer program 510 comprises computer readable code that, when run on a mobile camera device, causes the invention to be carried out using said combination of elements.

Figure 6:
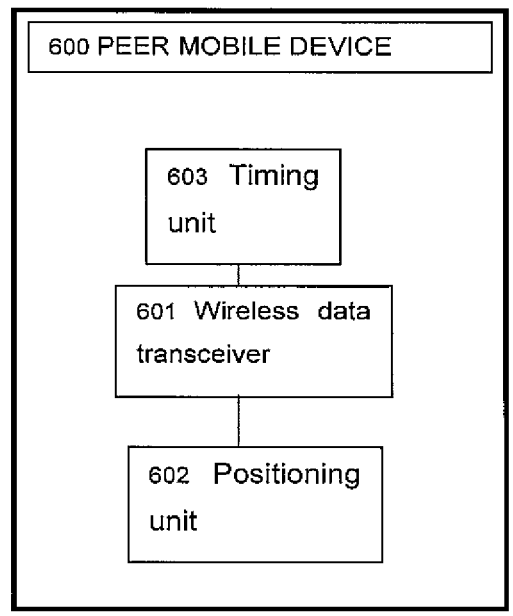
FIG. 6 illustrates schematically a peer mobile device that is configured to receive requests for and provide position and unique identification information.

Referring to FIG. 6, the peer mobile device 600 of the method of FIG. 1, having an identity associated with the peer mobile device, comprises a wireless data transceiver 601, a positioning unit 602 for determining a current position of the device, and a timing unit 603 for determining a current time.

Figure 7:
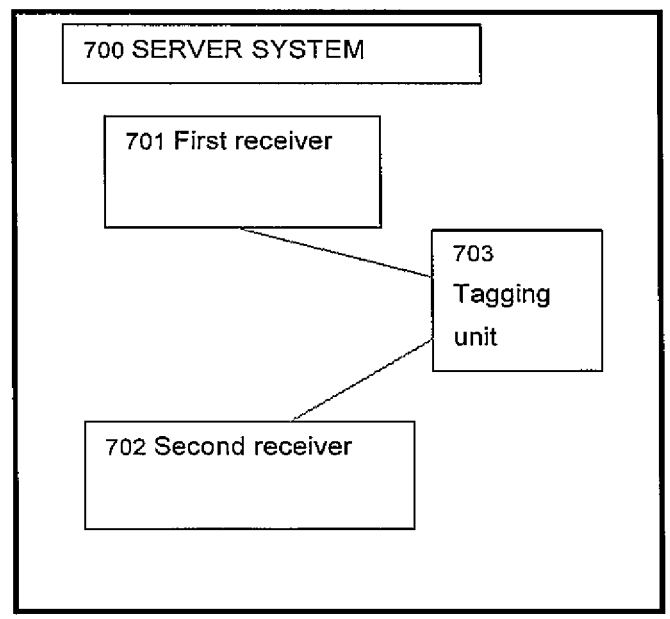
FIG. 7 illustrates schematically a server system that is configured to tag captured photograph or video with identities associated with peer mobile devices within a shooting area.

Referring to FIG. 7, the server system 700 of the method of claim 1 comprises a first receiver 701 for receiving photographs and/or videos, and associated shooting area definitions, from client devices, which may be, for example, a smartphone or a camera with wireless connectivity. The second receiver 702 is used for receiving the locations of client devices from those devices, wherein the client devices may be mobile camera devices or peer mobile devices. The tagging unit 703 is used for identifying client devices within the shooting areas associated with respective photographs and/or videos, and for tagging photographs and/or videos with the identities of identified client devices or their users. The tagging unit may correlate timing information associated with the locations of client devices with the times at which photographs or videos were taken in order to identify client devices within the shooting areas.

The invention claimed is:

1. A method of capturing photographs or videos and associated metadata, the method comprising:
   capturing a photograph or video using a mobile camera device at a shooting location and encompassing a shooting area;
   identifying the shooting area using at least positional and orientational detectors of the mobile camera device, and recording a definition of the shooting area, wherein the shooting area does not start at the location of the mobile camera device; and
   sending the captured photograph or video to a server system,
   wherein either at the mobile camera device or at the server system, the presence of peer mobile devices within the shooting area is identified by comparing positional information reported by those peer mobile devices with said recorded definition of the shooting area, and the captured photograph or video is tagged with identities associated with and sent from those peer mobile devices in response to the peer mobile devices receiving requests to return the identities after the presence of the peer mobile devices is identified.

2. The method according to claim 1, wherein the mobile camera device reports the shooting area definition to the server system and the presence of peer mobile devices within the shooting area is identified at the server system, the server system receiving positional information reported by peer mobile devices and correlating timing information with the times at which photographs or videos were taken.

3. The method according to claim 1, wherein a peer mobile device reports its positional information and identity to the mobile camera device.

4. The method according to claim 3, wherein the peer mobile device reports its positional information and identity to the mobile camera device using one selected from the group consisting of Bluetooth™, direct peer-to-peer wifi, 3G connections, RFID awareness established between the peer mobile device and the mobile camera device, and sending/receiving SMS messages.

5. The method according to claim 1, wherein a peer mobile device reports its positional information and identity to the server system.

6. The method according to claim 1, wherein the position of the mobile camera device is determined as absolute coordinates using a positioning unit of the mobile camera device.

7. The method according to claim 1, wherein the positional information reported by a peer mobile device comprises absolute coordinates determined using a positioning unit of the peer mobile device.

8. The method according to claim 1, wherein the shooting area is identified by also using one or more camera properties selected from the group consisting of a camera depth of focus, a focus distance, and a view angle.

9. The method according to claim 1, wherein said camera properties are determined by one selected from the group consisting of retrieving them from a record stored on the mobile camera device, and retrieving them from data stored in a photograph or video file.

10. A mobile camera device comprising:
a camera for capturing photographs and/or videos;
a positioning unit for determining a current position of the device;
an orientation determining unit for determining an orientation of the device in three dimensions;
a shooting area determining unit for determining and recording shooting area using an obtained current position and orientation, wherein the shooting area does not start at the location of the mobile camera device;
a peer mobile device identification unit for determining presence of peer mobile devices located within said shooting area by comparing positional information reported by those peer mobile devices with said recorded shooting area, and for sending requests for returning identities from the peer mobile devices after the presence of the peer mobile devices is determined;
a tagging unit for tagging captured photographs and/or videos with said identities associated with the peer mobile devices; and
a photograph and/or video upload unit for uploading tagged photographs and/or videos to a server system via a wireless network.

11. The mobile camera device according to claim 10, wherein said peer mobile device identification unit is configured to receive the positional information from the peer mobile devices and to compare this information to the recorded shooting area in order to determine whether the peer mobile devices are located within said recorded shooting area.

12. A server system comprising:
a first receiver for receiving photographs and/or videos, and associated shooting area definitions defining regions that contain subjects of the photographs and/or videos, from client devices, wherein each of the shooting area definitions includes a cuboid volume with vertices that are defined by absolute location coordinates;
a second receiver for receiving the locations of client devices from those devices; and
a tagging unit for identifying client devices within the shooting areas associated with respective photographs and/or videos, and for tagging photographs and/or videos with the identities of identified client devices or their users.

13. The server system according to claim 12, wherein said tagging unit correlates timing information associated with said locations with the times at which photographs or videos were taken in order to identify client devices within the shooting areas.

14. A non-transitory computer-readable medium storing computer readable code which, when the computer readable code is executed on a mobile camera device, is configured to cause the device to carry out a method comprising:
capturing photographs and/or videos;
determining a current position of the device;
determining an orientation of the device in three dimensions;
determining and recording a shooting area using an obtained current position and orientation, wherein the shooting area starts at a location beyond the location of the mobile camera device;
determining presence of peer mobile devices located within said shooting area by comparing positional information reported by those peer mobile devices with said recorded shooting area;
sending requests for returning identities from the peer mobile devices after the presence of the peer mobile devices is determined;
tagging captured photographs and/or videos with said identities associated with the peer mobile devices; and
uploading tagged photographs and/or videos to a server system via a wireless network.

15. The non-transitory computer-readable medium according to claim 14, wherein the shooting area is an estimated region to contain at least one subject.

16. The non-transitory computer-readable medium according to claim 15, wherein the method further comprises receiving the identities associated with the peer mobile devices directly from the peer mobile devices.

17. The non-transitory computer-readable medium according to claim 16, wherein the method further comprises determining presence of peer mobile devices located within a range of the mobile camera device but outside the shooting area, and separately tagging the captured photographs and/or videos with identities associated with the peer mobile devices that are located within the range of the mobile camera device but outside the shooting area.

18. The non-transitory computer-readable medium according to claim 17, wherein the peer mobile devices that are located within the range of the mobile camera device but outside the shooting area, are located behind the mobile camera device.

* * * * *